United States Patent
Bouthors

(10) Patent No.: US 7,389,418 B2
(45) Date of Patent: Jun. 17, 2008

(54) METHOD OF AND SYSTEM FOR CONTROLLING ACCESS TO CONTENTS PROVIDED BY A CONTENTS SUPPLIER

(75) Inventor: Nicolas Bouthors, Meylen (FR)

(73) Assignee: Volubill, Saint-Martin (FR)

( * ) Notice: Subject to any disclaimer, the term of this patent is extended or adjusted under 35 U.S.C. 154(b) by 677 days.

(21) Appl. No.: 10/324,142

(22) Filed: Dec. 20, 2002

(65) Prior Publication Data

US 2003/0135588 A1    Jul. 17, 2003

(30) Foreign Application Priority Data

Dec. 20, 2001 (FR) ................... 01 16589

(51) Int. Cl.
*H04L 9/00* (2006.01)
(52) U.S. Cl. ............... 713/168; 713/176; 713/183; 726/30
(58) Field of Classification Search ........... 713/176, 713/182; 380/30, 277; 709/219
See application file for complete search history.

(56) References Cited

U.S. PATENT DOCUMENTS

| 6,141,754 | A  | * | 10/2000 | Choy ............................ 726/1 |
| 6,182,142 | B1 | * | 1/2001  | Win et al. .................... 709/229 |
| 6,292,833 | B1 | * | 9/2001  | Liao et al. ................... 709/229 |
| 7,114,180 | B1 | * | 9/2006  | DeCaprio ..................... 709/219 |
| 7,185,363 | B1 | * | 2/2007  | Narin et al. ..................... 726/6 |
| 2003/0023862 | A1 | * | 1/2003 | Yamasaki et al. ........... 713/194 |
| 2003/0187955 | A1 | * | 10/2003 | Koch .......................... 709/219 |

FOREIGN PATENT DOCUMENTS

| FR | 2 792 143 A1 | 10/2000 |
| FR | 2 794 593 A1 | 12/2000 |
| WO | WO 01/17310 A1 | 3/2001 |

* cited by examiner

*Primary Examiner*—Gilberto Barron, Jr.
*Assistant Examiner*—Laurel Lashley
(74) *Attorney, Agent, or Firm*—Lowe Hauptman Ham & Berner LLP

(57) ABSTRACT

Access control to contents is by a user of a terminal connected through a computer network to at least one server of a contents supplier. The user selects or accepts interactive data exchange through a wireless communication network between a trusted organization on the computer network, and a mobile terminal accessible to the user.

30 Claims, 2 Drawing Sheets

METHOD OF AND SYSTEM FOR CONTROLLING ACCESS TO CONTENTS PROVIDED BY A CONTENTS SUPPLIER

RELATED APPLICATIONS

The present application is based on, and claims priority from, France Application Serial Number 01 16589, filed Dec. 20, 2001, the disclosure of which is hereby incorporated by reference herein in its entirety

FIELD OF INVENTION

The present invention relates to a method of and system for controlling access to contents provided by a contents supplier.

BACKGROUND ART

It is known how to centralize access control procedures to several separate Internet sites using a specific Internet service. A user uses this specific service to perform a Single Sign In (SSI) access control procedure to access secure contents of sites referenced with this specific service and for which the user is registered. When the user wants to access secure contents on a referenced Internet site for which he is registered, he is transferred to this specific service to perform the access control procedure. Once this procedure has been done, the user can browse without needing to identify himself on all other referenced sites for which he is registered.

The PASSPORT service, available from Microsoft Corporation, allows sites to be referenced with it and to perform access control procedures for these sites. User identification data are stored solely on a PASSPORT server. Therefore, this type of service avoids the need for referenced sites to manage the access control procedure and storage of identification data themselves.

However, even if a secure central procedure is used, user identification data are transmitted on the Internet network between a user's terminal and a server in the central access control service. It is known that transmission of data on the Internet network is not perfectly secure, which can be disadvantageous when, for example, the user wants to access strictly confidential information such as his bank accounts.

It is known how to authenticate a user by sending to the mobile telephone a short message service (SMS) message asking the user to send a password or an acknowledgement of reception. The reply sent by the user from his mobile telephone is then processed by a computer network central access control service. Therefore, the user password is not transmitted on the Internet network which makes the access control procedure relatively secure.

However, in this prior art, the central access control service is imposed on the user by a site including the contents that the user would like to access. Therefore, the user is not assured about the quality and source of this central service or about the data exchange made between the central service and the mobile telephone of the user. In particular, billing of messages sent between the user and the central access control service must be perfectly transparent. If the user has to pay, he must be able to transfer his bank account data to the central service without taking any risks. As already mentioned above, the central access control service may be unknown to the user, resulting in an insecure exchange of data between the user on his terminal or his mobile terminal.

SUMMARY OF THE INVENTION

An object of this invention is to overcome one or more disadvantages of the prior art by providing a new and improved method of and system for controlling access to contents by a user from a terminal of the user, wherein the access is perfectly secure and transparent particularly for transactions of contents involving billing.

This object is achieved by an access control process to the contents, by a user of a terminal connected through a computer network to at least one server belonging to a contents supplier. The method and system provide interactive data exchange through a wireless communication network between a trusted organization on the computer network, selected or accepted by the user, and a mobile terminal accessible to the user.

According to another feature, the data exchange occurs in response to the trusted organization sending a request to the mobile terminal, and asking the user to confirm or send authentication data from his mobile terminal.

According to another feature, the method and apparatus comprises testing the availability of the mobile terminal and determining the communication standard used by the mobile terminal.

According to another feature, the method and apparatus causes a computer network server agent, referenced as being trusted by the contents supplier or the contents supplier himself, to determine identification data for the user either by reading from at least one database or by sending a request for definition of these identification data on the user's terminal.

According to another feature, the server agent or the contents supplier sends a request containing user identification data to the trusted organization.

According to another feature, the identification data to be sent to the trusted organization are encrypted.

According to another feature, the trusted organization checks the source of the query.

According to another feature, a determined response is sent from the trusted organization to the server agent or to the contents supplier. The response includes a security level reached or that could be reached during an access control procedure that has been or has to be done.

According to another feature, the server agent or contents supplier reacts as a function of the response sent by the trusted organization. This reaction includes setting up replacement actions if the security level required by the user to access the contents has not been or cannot be achieved.

According to another feature, the server agent or the contents supplier sends to the trusted organization data representative of a security level required by the user to access the contents, and the access control procedure defined for this security level is established.

According to another feature, identification data including (1) the name and address of the trusted organization, (2) a user identifier with the trusted organization, (3) the security level required by the user for the contents to be accessed, and (4) replacement actions to be implemented, are supplied by the user in advance to at least one sheet managed by the server agent or the contents supplier.

According to another feature, the end of the access session to the required contents is controlled from a mobile terminal.

According to another feature, communication between the trusted organization and the mobile terminal is through a radio telephony network.

According to another feature, the radio telephony network operates in accordance with the Wireless Application Protocol (WAP), General Packet Radio Service (GPRS) or Universal Mobile Telecommunication System (UMTS) standard.

Another aspect of the invention concerns a system for access control to contents by a user of a terminal connected through a computer network to at least one contents supplier server. The system is arranged to establish interactive exchanges through a wireless communication network between a trusted organization on the computer network selected or accepted by the user, and a mobile terminal accessible to the user.

According to another feature, the data exchange is via a secure arrangement for transferring at least one request through the trusted organization to the mobile terminal. The request asks the user to confirm authentication data or to send authentication data from the mobile terminal.

According to another feature, the system is arranged for storing identification data about the user in at least one database located on a server agent of the computer network referenced as being a trusted server agent for the contents supplier, or at the contents supplier.

According to another feature, these identification data include the name and address of the user's trusted organization and a user identifier with the trusted organization.

According to another feature, the storage arrangement stores data representing a security level defined by the user to access the contents, and replacement actions to be set up if this level is not achieved or cannot be achieved, in at least one database.

According to another feature, these replacement actions are access to only part of the contents, access to the contents or part of the contents in only a read mode or sending the message to the mobile terminal through the trusted organization.

According to another feature, the trusted organization is arranged for testing the availability of the user's mobile terminal and the communication standard followed by the mobile telephone.

According to another feature, the system is arranged for activating replacement actions representing a procedure for authentication of a lower security level if the mobile terminal is not available and/or does not operate according to an appropriate standard.

According to another feature, the trusted organization is arranged for generating and sending a response to the server agent or to the contents supplier. The response includes data representative of the security level that is achieved or that could be achieved.

According to another feature, the server agent or the contents supplier is arranged for processing the response received from the trusted organization and for activating one or several replacement actions if the required security level has not been achieved or cannot be achieved.

According to another feature, the server agent or the contents supplier is arranged for reading the database(s) to determine identification data for the user and replacement actions for cases in which the security level is not achieved.

According to another feature, the system is arranged so the user can supply: (1) user identification data, and (2) the security level required by the user and replacement actions to be applied if this level is not achieved. The user can supply the identification data and security level on at least one sheet managed by the server agent or by the contents supplier.

According to another feature, the communication network between the trusted organization and the mobile terminal is a radio telephony network.

According to another feature, the radio telephony network operates according to the WAP, GPRS or UMTS standard.

The invention and its characteristics and advantages will become clearer after reading the description made with reference to the appended drawings, wherein:

DETAILED DESCRIPTION OF THE DRAWING

Figure 1:
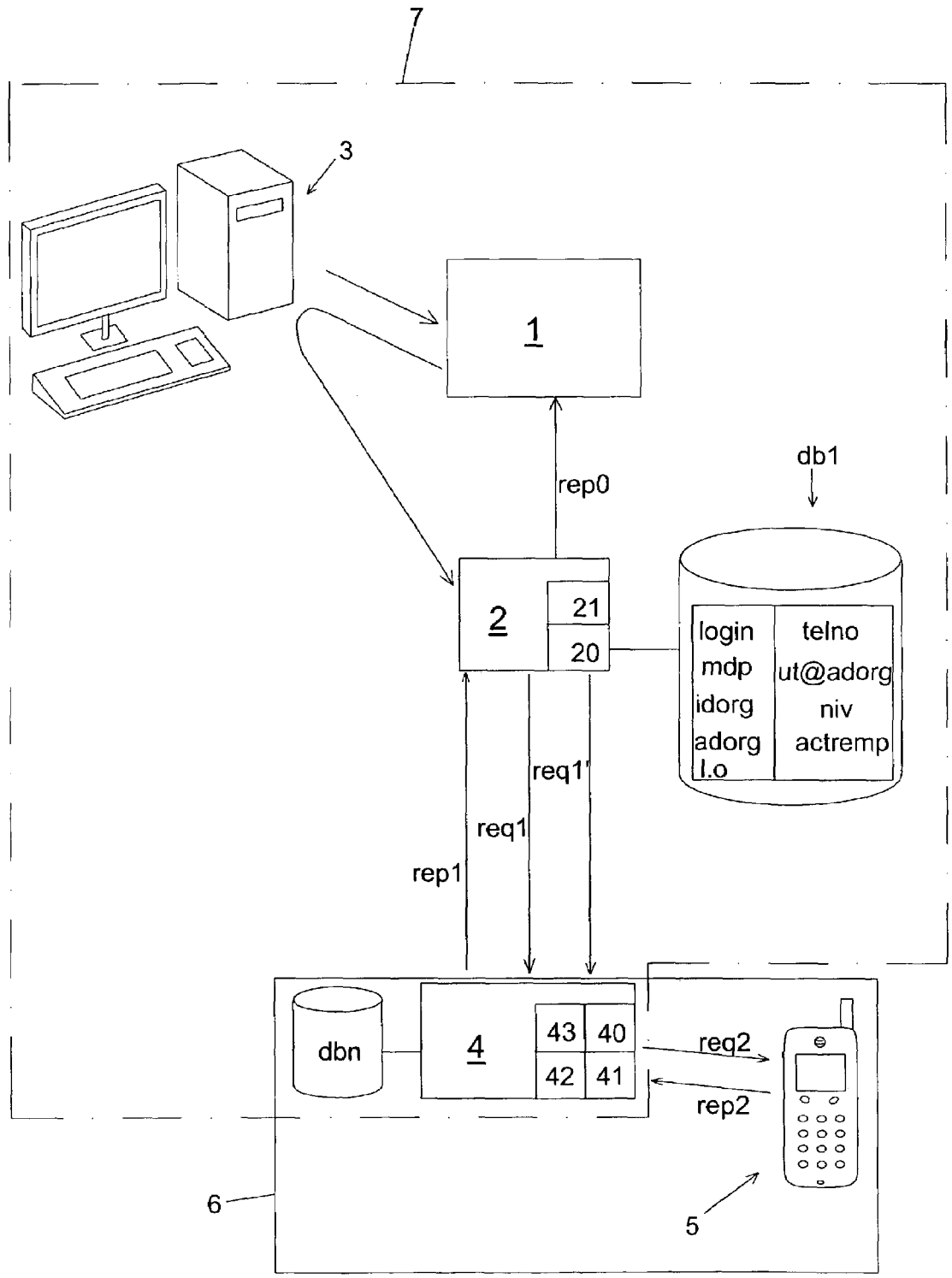
FIG. 1 is a block diagram of the general architecture of a system according to an embodiment of the invention.
Figure 2:
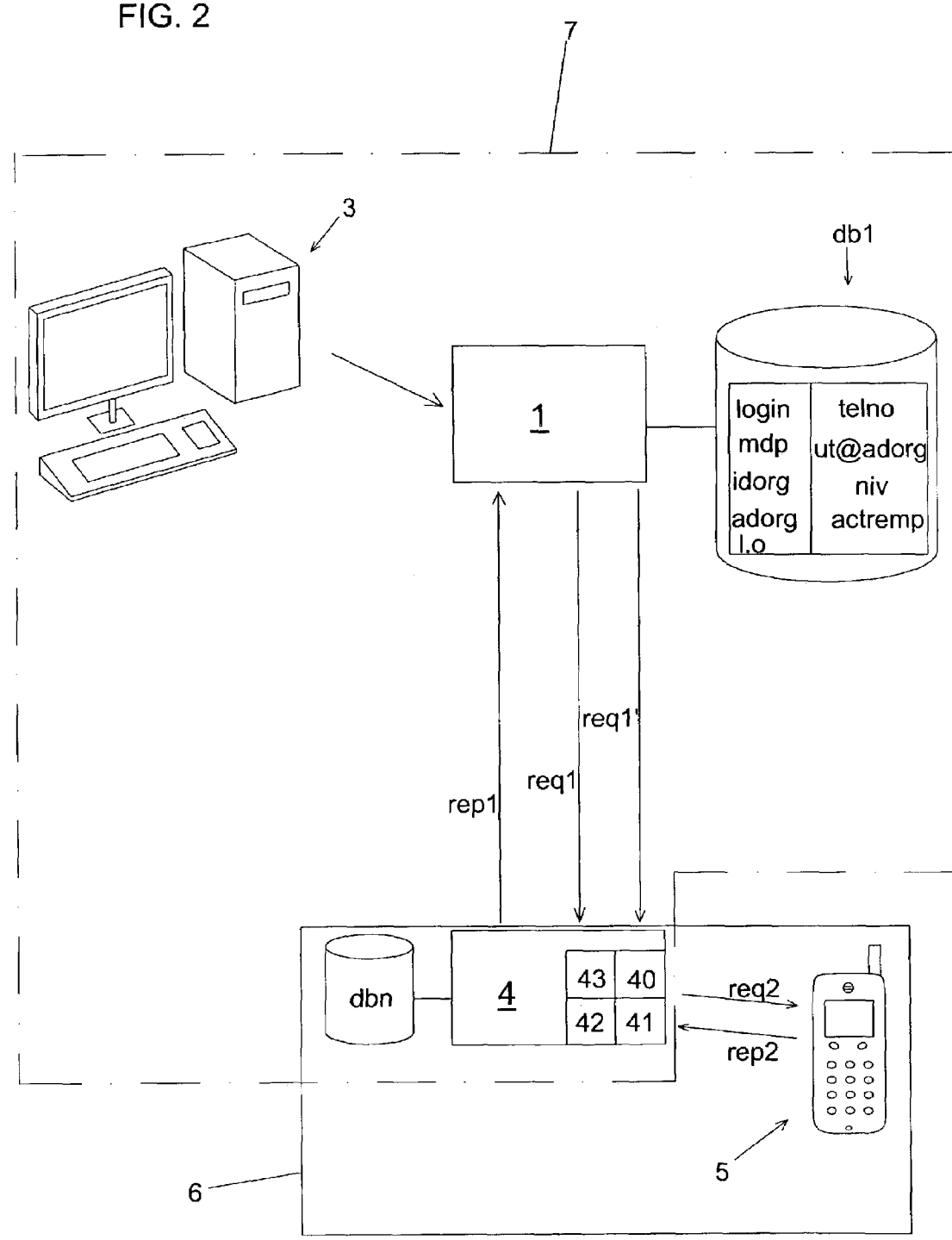
FIG. 2 is a block diagram of the general architecture of a system according to another embodiment of the invention.

This invention is now described with relation to FIGS. 1 and 2.

A user who would like to access, from his computer terminal (3), protected contents supplied by a contents supplier (1) is authenticated.

A contents supplier (1) is defined as any server or set of servers on a computer network (7) that provides one or several services to one or several users of computer terminals connected to this computer network (7).

One example of contents supplier (1) is a WEB server that puts information or contents on line on its Internet site, wherein the server is accessible from the computer terminal (3) of every user, for example, by using an Internet browser. A computer terminal (3) is defined as a standard computer system that can be connected to a computer network (7), for example such as the Internet network or an intranet type network.

Some contents of network (7) are protected by access control procedures. Within the framework of this control procedure, a user after being connected to the site, gives his login information (the term "login" is used throughout the remainder of the description) and a password, in order to access contents specific to that user. As already described above, services provide centralized access procedures to several sites. In this way, a user only needs to be recognized once by supplying a Single Sign In (SSI) profile to this service (2) so that he can access all sites for which he is registered referenced with this service (2). For example, this service (2) may be in the form of an Internet site onto which the user is transferred (as represented by the arrow shown in dashed lines in FIG. 1) when the user wants to access contents belonging to contents supplier (1). The contents of this site are stored on a server of computer network (7).

Throughout the remainder of the description, it will be assumed that contents supplier (1) uses a central access control service (2). Obviously, this is not always the case and the central access control procedure can be performed by the contents supplier (1), as shown in FIG. 2. In this case, the relations described below between the central access control service (2) and a trusted organization (4) are performed directly between the contents supplier (1) and trusted organization (4). It is to be understood that all tasks performed by the central access control service (2) can be carried out by the contents supplier (1) and that all the devices of the central access control service (2) belong to the contents supplier (1), if the contents supplier does not use a central access control service (2).

Information about the profile of users of one or several sites referenced with the central access control service (2) is stored in at least one database (db1) stored in memory (20) at the central access control service (2). For example, during initial use of the system by a particular user, central access control service (2) requests all this information from the user so that the information can be recorded, i.e., stored, in the database (db1). The information, for example, includes the name or login of the user (login), a password of the user (mdp), the name (idorg) and the address (idorg) of a trusted organization (4) that the user trusts, for example such as his mobile telephone operator, the mobile telephone number (telno) of the user, the address of the user (ut@adorg) or Internet identification with this trusted organization (4) and other information, the nature of which is described below. For example, this other information concerns the security level (niv) the user would like to set up to access these contents.

The user can select a higher or lower security level (niv), depending on the importance of the data in the secure contents. For example, the user can select the highest security level (niv) during access to his bank accounts. This highest security level (niv), for example, corresponds to an authentication procedure using the user's mobile telephone (5). The user can also define replacement actions (actremp) when the required security level (niv) is not achieved.

If the user is already registered, the user will only give the information necessary to be recognized and to find information corresponding to his profile in the database (db1), for each access control procedure with the central access control service (2). The user can identify himself using a name or login and password (mdp) type procedure in order to initialize an access control procedure. A read module can use this information and simply read the database (db1) to define the corresponding registration. The password (mdp) does not have to be supplied for each identification; a simple "cookie" is sufficient to store the password when it has been supplied once, and to display it every time the name or the login corresponding to this password is supplied.

The trusted organization (4) selected by the user comprises one or several servers of the computer network (7). This is an organization known to the user and chosen by the user, unlike the central access control service (2) that is chosen by the contents supplier (1). For example, the trusted organization (4) chosen by the user might be the mobile telephone operator (5) of the user. For example, the central access control service (2) can store identification data for different mobile telephony operators in every country in the world in a database (db1), and agree to work with the central service (2) to perform authentication procedures. The central service (2) can thus directly propose a precomposed list of these operators (l.o) registered in the database (db1) to the user. In one variant, the user himself supplies all essential information for recognition of the operator of his mobile telephone terminal (5). For example, the operator's recognition information may be the name (idorg) and address (adorg) of the operator so that, for example, a URL address can be identified on the computer network (7). In FIGS. 1 and 2, the trusted organization (4) is shown as belonging both to the computer network (7) and to the communication network (6) with the mobile telephone (5) due to the fact that the trusted organization is capable of setting up a communication with other servers on the computer network (7) through this network and with the mobile telephone (5) through a wireless communication network (6), for example such as a radio telephony network.

Information related to each user profile can, for example, include information related to the authentication procedure that the user wants to use, to allow access to the secure contents. As described above, the user can decide to be authenticated from his mobile telephone (5) to obtain the highest security level.

During use of the access control procedure, the central access control service (2) builds at least one request (req1) from information collected about the user in the database (db1). This request (req1) is an authentication request that the central service (2) sends to the user's trusted organization (4), for example his mobile telephony operator identified by the address (adorg) of the user on the computer network (7). For example, the request (req1) can include data representative of information extracted from the database (db1), such as the user's name or login, the mobile telephone number (telno) of mobile telephone terminal (5) accessible to the user or the address (ut@adorg) of the user that identifies the user with his mobile telephone operator, and information enabling identification of the sender of the data to be identified, in other words the central service (2) and data representative of the requested security level (niv). In order to be able to certify a data source, data to be sent about the user may be previously encrypted by an encryption/decryption module (21), for example by asymmetric encryption with a public key and a private key.

The trusted organization (4) comprises a transmitter/receiver module (40) for transmission and reception of data. The trusted organization (4) identifies the sender and possibly does a decryption using an encryption/decryption module (42) operating on data received using the sender's public key, when the trusted organization receives the data. The trusted organization (4) initially checks that the central access control service (2) that sent the data is referenced with it, and therefore that the data can be trusted. Decryption of the data is thus a way of certifying the source of these data. The trusted organization (4) might also need to use a search module (43) to make searches in one of databases (dbn) of the trusted organization for (a) the user's address (ut@adorg), and (b) the identifier corresponding to the mobile telephone number (telno) that was sent to the trusted organization.

The trusted organization (4) then performs the authentication procedure for the user of the computer terminal (3) depending on the required security level (niv); in this case using the mobile telephone (5) accessible to the user. This authentication is done using an authentication module (41) that can set up an interactive data exchange session, for example of encrypted data, between the trusted organization (4) and the mobile telephone (5). This interactive session is performed using a wireless communication network (6) between the trusted organization (4) and the mobile telephone (5); wireless network (6) is, for example, a radio telephony network using any of the WAP, GPRS or UMTS standards.

The authentication module (41) comprises a verification sub-module with a national mobile telephone server; the mobile telephone (5) possibly being connected to or disconnected from the communication network (6). Another sub-module is used to determine the standard according to which the mobile telephone (5) belonging to the user is operating, from the same server, or a different server. The standard can be one of the standards described above, or another standard, such as the Global System for Mobile Communications (GSM) standard.

In the first case, in other words if the mobile telephone (5) is in a connected state and is operating according to one of the WAP, GPRS or UMTS standards, the trusted organization (4) sends a request (req2) comprising encrypted data to the mobile telephone (5) identified on the communication network (6) by its telephone number (telno) or by its address (ut@adorg), through at least one communication network (6) appropriate for the receiver's mobile telephone (5). The data for this request (req2) are decrypted by an encryption/decryption module of the mobile telephone (5). This request (req2) is a request to the user to confirm information or to send confidential information to the user, for example such as a password to allow the user to access the secure contents of the contents supplier (1). The user can also specify how long he would like to remain on the secure contents.

In the second case, in other words if the mobile telephone (5) accessible to the user is in a connected state but is not operating according to one of the standards mentioned, replacement actions (actremp) according to an authentication procedure corresponding to a security level lower than the required level are performed. These replacement actions (actremp) can be defined by the user and communicated alongside the data in the request (req1) by the central server (2) to the trusted organization (4). For example, the replacement action can include sending an SMS (short message service) message to the mobile telephone (5). If the mobile telephone (5) is also in a disconnected state, these actions by the trusted organization (4) include, for example, making a search on the telephone number (telno) that was sent to the trusted organization to find out if the telephone number was actually referenced in one of its databases (dbn) and actually corresponds to the user's name or login (login).

According to one variant embodiment, if the mobile telephone (5) is in a disconnected state and/or is not functioning according to one of the interactive data exchange standards, (a) the required optimum security level cannot be achieved, and (b) the trusted organization (4) sends to the central access control service (2) a response containing data representative of this result. As a function of this response, the central access control service (2) then refers to the database (db1) to decide on replacement actions (actremp) to be set up for a lower security level. The central access control service (2) then sends a new request (req1') to the trusted organization (4) asking the trusted organization to set up these replacement actions (actremp), for example including sending a short SMS type message on the mobile telephone (5).

In response to the request (req2), the encrypted data (rep2) are sent by a send module on the mobile terminal (5) to the receiver module (40) of the trusted organization (4). These data represent the user's response or lack of response. For example, the lack of response occurs if the user did not want to authenticate himself, if his mobile terminal (5) was no longer connected to the communication network (6), or if the data exchange session was interrupted. The trusted organization then sends the result (rep1) of the authentication procedure to the central access control service (2). If the authentication procedure took place correctly, the central access control service (2) then informs the contents supplier (1) accordingly by sending a response (rep0) indicating that the user can access the secure contents. On the other hand, if the authentication procedure did not take place according to the required security level (niv) or if it took place according to the lower security level determined according to the variant described above, the response (rep1) sent to the central service (2) includes the results of the procedure set up in accordance with the lower security level. Depending on this response and the security level achieved, the central access control service (2) also orders other appropriate replacement actions (actremp) to be established. These replacement actions (actremp) can be defined in advance by the user and stored in the database (db1). These replacement actions (actremp) are, for example, set up at the contents supplier (1). For example, these actions can include making the contents or part of the contents of supplier (1) accessible in read only mode or allowing access to only part of the contents, or only activating some functions, for example in the case of a bank account, by only authorizing transfers between two accounts belonging to the user and prohibiting transfers to accounts that do not belong to the user. The user might need to validate several intermediate requests during the access control procedure to the contents, and during a single session between the mobile telephone (5) and the trusted organization (4). As long as the session is still in progress, the trusted organization (4) controlled by the central access control service (2) or the contents supplier (1) might need to send requests or information on the user's mobile telephone (5) at any time.

The end of a session between the mobile telephone (5) and the trusted organization (4) can be controlled by the user from his mobile telephone (5) at any time. The end of such a session terminates the access control procedure of the current contents, for example stopping the user from accessing the different contents services.

The mobile telephone (5) can be replaced by any mobile terminal that operates according to interactive data exchange standards, for example such as those mentioned above. Therefore the mobile terminal can be a Personal Digital Assistant (PDA), a satellite telephone, etc.

As described above with reference to FIG. 2, the access control procedure can be implemented and controlled directly by the contents supplier (1) that is then in direct communication with the trusted organization (4).

Therefore, the system and method are completely secure, particularly because no password passes through the Internet. Furthermore, each entity in the system is known to one or several other entities. The central access control service (2), if there is one, is known to the contents supplier (1), the trusted organization (4) is chosen by the user and therefore known to him, the trusted organization (4) knows the central access control service (2) if there is one, the mobile telephone (5) is known to the trusted organization (4), etc. Encryption of data is also a way of certifying the source of the exchanged data. The central access control service (2) does not take control since the user chooses to deal with his trusted organization (4).

It must be obvious to those skilled in the art that this invention enables many other specific embodiments without going outside the scope of the invention as claimed. Consequently, these embodiments must be considered simply as illustrations, but that can be modified within the scope defined in the attached claims, and the invention is not limited to the details given above.

The invention claimed is:

1. A method of controlling access to a content by a user of two terminals, using a first terminal connected through a computer network to at least one server of a contents supplier, the method comprising causing an interactive data exchange through a wireless communication network between a trusted organization on the computer network and a wireless mobile second terminal accessible to the user, the trusted organization being selected or accepted by the user and the interactive data exchange being triggered by the first terminal through the contents supplier.

2. Method according to claim 1, wherein the interactive data exchange comprises causing the trusted organization to send a request to the wireless mobile second terminal, the request asking the user to confirm or send authentication data from the mobile terminal.

3. Method according to claim 1, further comprising testing the availability of the wireless mobile second terminal and determining the communication standard used by the mobile terminal.

4. Method according to claim 1, further comprising determining identification data about the user either by reading from at least one database or by sending a request for definition of these identification data to at least one of the first terminal and wireless mobile second terminal, the identification data being determined by a server agent on the computer network referenced as being trusted for the contents supplier, or by the contents supplier.

5. Method according to claim 4, further comprising causing the server agent or the contents supplier to send a request including user identification data to the trusted organization.

6. Method according to claim 5, further comprising encrypting the identification data to be sent to the trusted organization.

7. Method according to claim 5 further comprising causing the trusted organization to check the source of the request.

8. Method according to claim 4, further comprising sending a determined response from the trusted organization to the server agent or to the contents supplier.

9. Method according to claim 8, wherein the response sent from the trusted organization to the server agent includes a security level achieved or that could be reached during an access control procedure that has been done or is to be done.

10. Method according to claim 8, further comprising causing the server agent or the contents supplier to react based on the response sent by the trusted organization, the reaction including establishing replacement actions if the security level required by the user to access of the contents supplier has not been or cannot be achieved.

11. Method according to claim 4, further comprising causing the server agent or the contents supplier to send data to the trusted organization, the data being representative of a security level required by the user for access to the contents, and establishing an access control procedure defined for the security level.

12. Method according to claim 4, further comprising causing the user to input in advance on at least one sheet managed by the server agent or the contents supplier the identification data including the name and address of the trusted organization, a user identifier with the trusted organization, the security level required by the user for the contents to be accessed and replacement actions to be performed.

13. Method according to claim 1, further comprising performing a control step at the end of an access session to the required contents controlled from the wireless mobile second terminal.

14. Method according to claim 1, wherein a communication between the trusted organization and the wireless mobile second terminal is made via a radio telephony network.

15. Method according to claim 14, wherein the radio telephony network operates in accordance with one of the WAP, GPRS or UMTS standards.

16. System for access control to a content by a user of two terminals, wherein the user can use a first terminal connected through a computer network to at least one server of a contents supplier, the system comprising a data exchanger for making interactive data exchanges through a wireless communication network between a wireless mobile second terminal accessible to the user and a selected trusted organization on the computer network or a trusted organization accepted by the user, the data exchanger being arranged to be triggered by the first terminal through the contents supplier.

17. System according to claim 16, wherein the data exchanger comprises a secure processor for (a) transferring at least one request through the trusted organization to the wireless mobile second terminal, (b) asking the user to (i) confirm authentication data or (ii) send authentication data from the wireless mobile second terminal.

18. System according to claim 16, further comprising a memory for storing identification data about the user in at least one database located on a server agent of the computer network referenced as being trusted by the contents supplier, or at the contents supplier.

19. System according to claim 18, wherein the identification data include the name and the address of the user's trusted organization and a user identifier including the trusted organization.

20. System according to claim 18, wherein the memory is arranged for storing data representing a security level defined by the user to access contents of the supplier, and replacement actions to be established if the security level is not achieved or cannot be achieved in at least one database.

21. System according to claim 20, wherein the replacement actions include access to only some contents of the contents supplier, access to the contents of the contents supplier, or some content in a read only mode, or sending a message to the wireless mobile second terminal via the trusted organization.

22. System according to claim 16, wherein the trusted organization is arranged for testing the availability of the mobile terminal and a communication standard followed by the mobile terminal.

23. System according to claim 22, wherein the system is arranged for activating replacement actions representing a procedure for authentication of a lower security level if the mobile terminal is not available and/or does not operate according to an appropriate standard.

24. System according to claim 20, wherein the trusted organization is arranged for generating and sending a response to the server agent or to the contents supplier, the response comprising data representative of the security level achieved or that could be achieved.

25. System according to claim 24, wherein the server agent or the contents supplier is arranged for processing the response received from the trusted organization and for activating one or several replacement actions if the required security level has not been achieved or cannot be achieved.

26. System according to one of claim 20, wherein the server agent or the contents supplier is arranged for reading the at least one database to determine (a) identification data for the user and (b) replacement actions for cases in which the security level is not achieved.

27. System according to claim 18, further comprising an input device for enabling the user to supply user identification data, the security level required by the user and replacement actions to be applied if this level is not achieved, on at least one sheet managed by the server agent or by the contents supplier.

28. System according to claim 16, wherein the wireless communication network between the trusted organization and the mobile terminal includes a radio telephony network.

29. System according to claim 28, wherein the radio telephony network functions according to one of the WAP, GPRS or UMTS standards.

30. A method of controlling coupling of a mobile wireless terminal for a user to a server arrangement of an organization trusted by the user, the trusted organization and the mobile terminal including transmitters and receivers that are parts of a wireless communication network; the trusted organization also being part of a computer network including a client computer of the user of the mobile terminal, the computer network also including a protected contents supplier storing a profile of the user; the trusted organization, the client computer and the protected contents supplier including transmitters and receivers that are parts of the computer network; the method comprising:

in response to the user logging in to the computer network, causing the protected contents supplier to send an authentication request with at least some of the protected contents about the profile of the user to the trusted organization via the computer network, and the trusted organization responding to the authentication request by determining whether the protected contents supplier can be trusted as being authentic for the user of the client computer; the authentic determination being performed in response to the trusted organization communicating with the mobile terminal via the wireless communication network; and establishing coupling between the mobile wireless terminal and the server arrangement of the trusted organization in response to the authentic determination being positive.

* * * * *